United States Patent
Bubeck et al.

[11] Patent Number: 5,992,364
[45] Date of Patent: Nov. 30, 1999

[54] INTERNAL COMBUSTION ENGINE WITH DIRECT FUEL INJECTION

[75] Inventors: Günther Bubeck, Schorndorf; Michael Kühn, Ebersbach, both of Germany

[73] Assignee: DaimlerChrysler AG, Stuttgart, Germany

[21] Appl. No.: 08/933,492

[22] Filed: Sep. 18, 1997

[30] Foreign Application Priority Data

Sep. 18, 1996 [DE] Germany .......................... 196 37 993

[51] Int. Cl.⁶ .................................................. F02B 77/02
[52] U.S. Cl. ................................... 123/169 PH; 123/266
[58] Field of Search ....................... 123/169 PH, 169 PA, 123/266, 298

[56] References Cited

U.S. PATENT DOCUMENTS

| | | |
|---|---|---|
| 2,422,610 | 10/1947 | Bagnulo . |
| 4,542,724 | 9/1985 | Blais ........................................ 123/266 |
| 4,686,941 | 8/1987 | Ariga . |
| 4,766,861 | 8/1988 | Finsterwalder .......................... 123/254 |
| 4,892,070 | 1/1990 | Kuhnert .................................. 123/274 |
| 4,930,473 | 6/1990 | Dietrich ................................. 123/266 |
| 5,105,780 | 4/1992 | Richardson ............................. 123/263 |
| 5,335,635 | 8/1994 | Kadoi et al. ............................ 123/295 |

FOREIGN PATENT DOCUMENTS

| | | |
|---|---|---|
| 30 12 022 | 4/1983 | Germany . |
| 32 07 179 | 9/1983 | Germany . |
| 43 24 642 | 1/1994 | Germany . |
| WO 84/02744 | 7/1984 | WIPO . |

*Primary Examiner*—Noah P. Kamen
*Assistant Examiner*—Jason Benton
*Attorney, Agent, or Firm*—Klaus J. Bach

[57] ABSTRACT

In an internal combustion engine with direct fuel injection, which comprises a number of operating elements each including a combustion chamber delineated by an internal wall of a cylinderhead and a piston movably disposed in a cylinder, an injector mounted in the cylinderhead has a fuel injection nozzle which injects fuel into the combustion chamber in a cone-like pattern wherein an ignitable fuel/air mixture is formed and a spark plug is mounted on the cylinderhead within a spark plug sleeve which extends into the combustion chamber and forms, adjacent the spark plug electrodes, an ignition chamber which is in communication with the interior of the cone-like fuel spray pattern so as to receive therefrom an easily ignitable relatively rich fuel mixture which, upon ignition by the spark plug, generates a flame beam igniting the fuel mixture within the cone-like spray pattern.

12 Claims, 2 Drawing Sheets

INTERNAL COMBUSTION ENGINE WITH DIRECT FUEL INJECTION

BACKGROUND OF THE INVENTION

The invention relates to an internal combustion engine with direct fuel injection, which provides for a stratified combustion in a wide performance range and includes pistons which are movably disposed in cylinders and define combustion chambers limited by a cylinderhead wall. Injectors are mounted in the cylinderhead which inject fuel into the combustion chambers in cone-like patterns to form in the combustion chambers with the combustion air a fuel/air mixture which is ignited by a spark plug.

DE 43 24 642 A1 discloses such an internal combustion engine including a combustion chamber which is delimited by a piston disposed in a cylinder of the internal combustion engine and the inner wall of a cylinderhead. An injection nozzle of an injector injects fuel in a cone-like pattern into the combustion chamber where an ignitable fuel/air mixture is formed with the combustion air admitted to the combustion chamber. The mixture is ignited by a spark plug having electrodes which extend into the cone-shaped fuel spray pattern and between which a spark is generated. The electrodes are arranged adjacent the injection nozzle whereby a fuel-rich mixture is ignited such that stratified combustion is achieved depending on the engine load, and, as a result of a pressure and temperature increase resulting from the combustion of the fuel-rich mixture portion, the fuel-lean mixture in the remainder of the combustion chamber is combusted. The electrodes are wetted by the fuel injected into the combustion chamber so that, over a period of time, carbon deposits may form on the electrodes whereby the development of a spark may be prevented. Furthermore, the electrodes must be relatively long in order to facilitate ignition of the mixture adjacent the fuel injection nozzle. As a result, depending on the engine load, either knocking may occur by excessively heated electrodes in the area where they are exposed to the fuel or carbon deposits may form on the electrodes because of cooling of the electrodes by their exposure to the fuel.

It is the principal object of the present invention to provide an internal combustion engine with direct fuel injection which will maintain optimal operating conditions over a long period of time.

SUMMARY OF THE INVENTION

In an internal combustion engine with direct fuel injection, which comprises a number of operating elements each including a combustion chamber delineated by an internal wall of a cylinderhead and a piston movably disposed in a cylinder, an injector mounted in the cylinderhead has a fuel injection nozzle which injects fuel into the combustion chamber in a cone-like pattern wherein an ignitable fuel/air mixture is formed and a spark plug is mounted on the cylinderhead within a spark plug sleeve which extends into the combustion chamber and forms, adjacent the spark plug electrodes, an ignition chamber which is in communication with the interior of the cone-like fuel spray pattern so as to receive therefrom an easily ignitable relatively rich fuel mixture which, upon ignition by the spark plug, generates a flame igniting the fuel mixture within the cone-like spray pattern.

Since at least the part of the spark plug which extends into the combustion chamber is surrounded by a spark plug sleeve, the electrodes are not directly exposed to the fuel injected into the combustion chamber. The spark plug sleeve is preferably open at its end projecting into the combustion chamber so that, during the compression stroke of the piston, the fuel/air mixture is pressed from the combustion chamber into the spark plug sleeve. As the spark plug sleeve extends into the mixture envelope of the conical fuel spray pattern, the spark plug sleeve is filled with an easily ignitable relatively rich fuel/air mixture having a relatively uniform fuel content. Preferably, the end portion of the spark plug sleeve includes an ignition chamber in which the spark plug electrodes are disposed posed geometrically in alignment with the fuel spray cone envelope. The ignition chamber provides for an essentially fixed amount of mixture which is introduced into the ignition chamber during the compression stroke so that the fuel-rich mixture provided adjacent the spark plug is essentially stable. As a result, the ignition behavior remains the same and the combustion chamber charge is completely burnt. The initial ignition of the ignition chamber charge ignites the mixture in the combustion chamber from within the fuel spray cone where the fuel-rich mixture is burnt with a relatively high combustion speed and the fuel-lean layer in the areas around the fuel spray cone which includes areas with different fuel concentrations is ignited on a wide front while its pressure and temperature rises.

In another embodiment of the invention, the spark plug sleeve includes an opening extending in circumferential direction. The opening provides for a fluid communication between the combustion chamber and the ignition chamber for scavenging the ignition chamber during the gas change cycle, whereby the fresh mixture entering the ignition chamber in the spark plug sleeve during the compression stroke pushes the burnt gas out of the ignition chamber through the opening. Preferably, this opening is arranged about at the level of the outside of the fuel mixture cone generated during fuel injection. As a result, the ignition of the main mixture component in the combustion chamber occurs concurrently within and without the mixture cone envelope whereby the combustion speed is increased and the chances of carbon deposits developing on the spark plug electrodes are further reduced. Furthermore, the double ignition and the combustion behavior so obtained permits for a later fuel injection and ignition timing during the compression stroke of the internal combustion engine. This provides for a more stable stratification during stratified charge engine operation as well as a reduced fuel consumption and reduced emissions, particularly of $NO_x$. If the opening is arranged diametrically opposite the fuel injection nozzle, mixture components in the area surrounding the fuel mixture cone, which are particularly lean in the area of the fuel mixture cone shaded by the spark plug sleeve, are safely ignited by a flame beam emitted from the opening in the spark plug sleeve. It is advantageous to provide several openings in the spark plug sleeve essentially at the same axial location in order to ignite the surrounding mixture in a wider area so as to further increase the combustion speed of the combustion chamber charge.

If the injector is disposed in the cylinderhead coaxially with the piston such that the injection nozzle is disposed in the combustion chamber in a central position, the fuel/air mixture will not come into contact with the inner wall of the cylinderhead and cooling of the mixture is therefore avoided. The higher operating temperature of the internal combustion engine obtained thereby increases the ignitability, particularly of the lean mixture components so that the quality of the stratified combustion in the low load range of the internal combustion engine and the complete combustion of an essentially homogeneous fuel/air mixture in the full load range of the internal combustion engine are improved. Preferably, the longitudinal axis of the injector and the axis of the spark plug sleeve intersect in order to improve the withdrawal of fuel-rich mixture from the interior of the fuel spray cone into the ignition chamber.

It is further advantageous if the spark plug sleeve is internally threaded at its end adjacent the cylinderhead so that the threaded spark plug shank can be threaded into the spark plug sleeve. The position of the spark plug during operation of the internal combustion engine is predetermined by a shoulder provided on the spark plug sleeve on which a mounting head formed on the spark plug is seated when the spark plug is fully screwed into the spark plug sleeve. It is further advantageous if the spark plug sleeve extends through the cylinderhead and has the shoulder formed at a certain location so that the axial mounting position of the spark plug sleeve in the cylinderhead is determined thereby.

The spark plug sleeve is preferably cylindrical, providing for a minimum spark plug sleeve surface area and minimal disturbances for the stratification of the combustion chamber charge by blanketing of the conical fuel spray beam by the spark plug sleeve. In a further advantageous embodiment of the invention, the combustion chamber has a conical shape whereby the formation of the fuel/air mixture by the cone-like fuel spray beam in a cone-like stratification layer arrangement is accelerated. Preferably, the inner wall of the cylinderhead extends parallel to the outer surface of the fuel/air mixture envelope. Then the combustion chamber is very compact and, depending on the engine load, mixture for stratified combustion or, with a high engine load, mixtures for a homogeneous combustion can be readily formed.

The injector may he disposed with its end including the injection nozzle in an injector support such that the injection nozzle is accurately positioned in the combustion chamber and that it can be easily exchanged without requiring expensive and time-consuming adjustments of the injection parameters if it should be necessary to exchange the injector at some point in time.

A particular embodiment of the invention will he described below in detail on the basis of the accompanying drawings:

DESCRIPTION OF A PREFERRED EMBODIMENT

Figure 1:
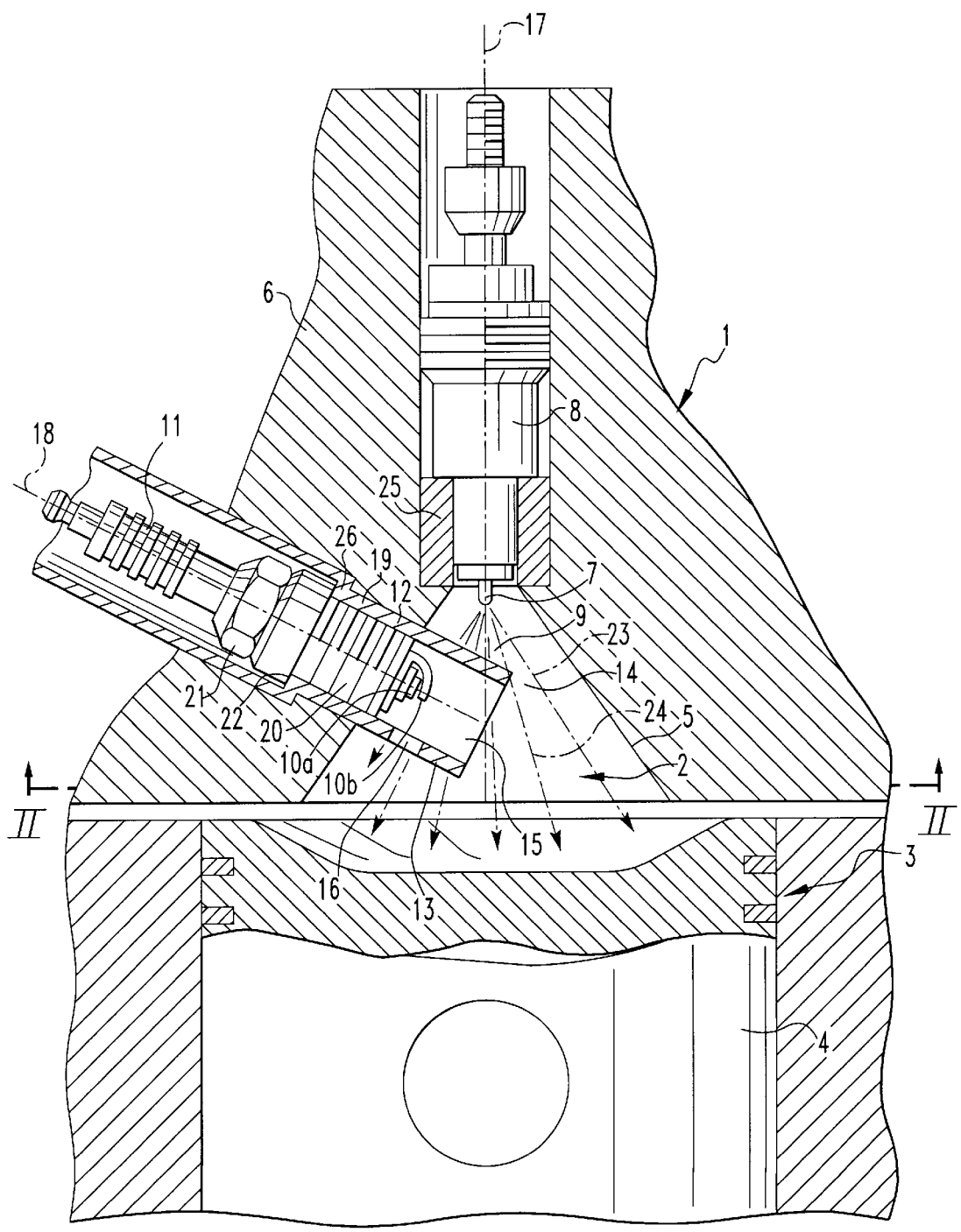
FIG. 1 is a cross-sectional view of a cylinderhead showing a combustion chamber of an internal combustion engine.

The operating element 1 (cylinder, piston and cylinderhead) of an internal combustion engine with direct fuel injection comprises a cylinder 3 in which a piston 4 is movably disposed. The cylinder 3 is closed by a cylinderhead 6 with an interior wall 5 which, together with the piston 4, delineates a cone-shaped combustion chamber 2 having the widest cross-section adjacent the piston 4. An injector 8 is disposed in the cylinderhead 6 and is supported, at its end adjacent the combustion chamber, in an injector support structure 25 wherein the longitudinal axis 17 of the injector 8 extends co-axially with the piston 4. The injector 8 includes an injection nozzle 7 which generates a cone-like fuel spray pattern 9 and is disposed centrally in the upper part of the combustion chamber 2. At the end of each compression stroke of the piston 4, the injection nozzle 7 injects fuel into the combustion chamber 2 in a cone-like spray pattern 9 having a mixture envelope 14 with an outer surface 23 extending parallel to the inner wall 5 of the combustion chamber.

The cone-like spray pattern 9 consists of an ignitable fuel/air mixture formed by air supplied to the combustion chamber. Depending on the engine load, the engine is operated with a stratified charge under quality control wherein the cone-like spray pattern 9 includes a fuel-rich mixture and the mixture envelope 14 includes a leaner fuel mixture. The fuel/air mixture is ignited by a spark plug 11, which is disposed in a spark plug sleeve 12 to be protected thereby from carbon deposits resulting from the spark plug being wetted by the fuel injected into the combustion chamber 2. The spark plug sleeve extends through the mixture envelope 14 so that an easily ignitable fuel mixture from within the cone-like fuel spray pattern 14 is provided in the ignition chamber 15 of the spark plug sleeve. The fuel mixture from within the cone-like fuel spray pattern 9 is relatively fuel-rich and is pressed during the compression stroke of the piston 4 through the front opening into the ignition chamber 15 which is vented by a side opening 16.

The fuel-rich mixture in the ignition chamber 15 is then ignited by a spark formed between the electrodes 10a, 10b of the spark plug 11 and initiates ignition of the stratified charge in the combustion chamber 2.

The fuel mixture is ignited within the cone-like pattern 9 and also at the inner side 24 of the mixture envelope 14. The opening 16 in the spark plug sleeve 12, which provides for fluid communication between the ignition chamber 15 and the combustion chamber 2 is arranged in the area of the mixture envelope 14, that is, adjacent the outer surface area 23 thereof and on the side remote from the injection nozzle 7. Instead of a single opening, there may be provided several side openings providing for separate flame beams extending in slightly different directions. In this way, the mixture envelope 14 is ignited about at the same time at its inner surface 24 and the outer surface area 23. The mixture envelope comprises lean fuel mixtures of different fuel contents. Particularly in the area of the cone-like fuel spray pattern 9 which is shaded by the spark plug sleeve 12, the fuel mixture envelope 14 includes a relatively lean fuel/air mixture. However, with the double-sided ignition, these relatively fuel-lean areas are also rapidly burnt.

The cylindrical spark plug sleeve extends through the cylinderhead 6 and is so arranged that the sleeve axis 18 of the spark plug sleeve 12 intersects the longitudinal axis 17 of the injector 8 on which also the injection nozzle 7 is disposed. The spark plug sleeve is provided near its end in the cylinderhead 6 with an internal thread 19 into which a threaded shank 20 of the spark plug 11 is screwed until the mounting head 22 of the threaded spark plug shank 20 is disposed on a support shoulder 22 of the spark plug sleeve 12. The electrodes 10a, 10b extending into the ignition chamber 15 are short since the spark plug sleeve 12 retains the easily ignitable mixture withdrawn from the interior of the cone-like fuel spray patter 9 in the ignition chamber 15 in the area of the ignition source. In the area of the support shoulder 22, the spark plug sleeve 12 diameter is enlarged so that a stop 26 is formed with which the spark plug sleeve 12 is seated and properly located in the cylinderhead.

Figure 2:
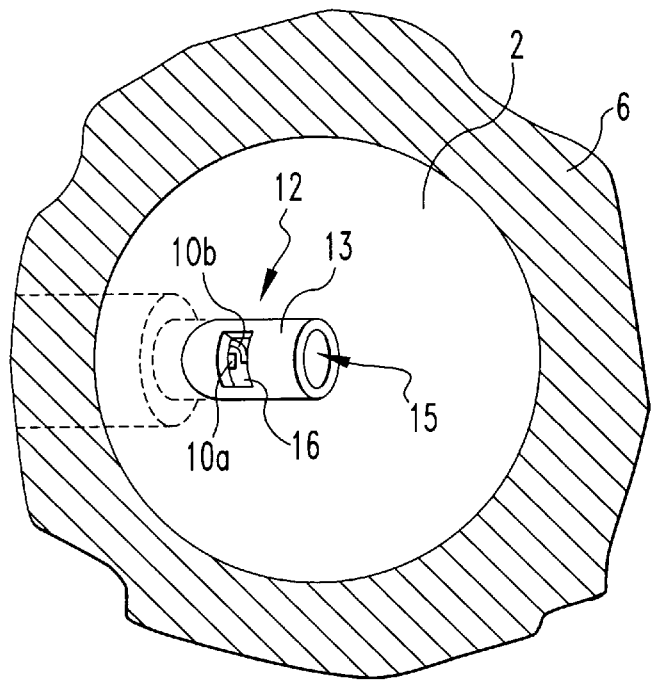
FIG. 2 is a cross-sectional view taken along lines II—II of FIG. 1.

FIG. 2 shows a spark plug sleeve 12 with an end portion 13 projecting from the cylinderhead 6 into the cone-like combustion chamber 2 of an internal combustion engine. The spark plug sleeve 12 includes a spark plug with electrodes 10a, 10b disposed in an ignition chamber 15 which is formed in the end portion 13 of the spark plug sleeve 12. The ignition chamber 15 is in fluid communication with the combustion chamber 2 by way of an opening 16 which extends in circumferential direction of the spark plug sleeve 12. A spark formed between the electrodes 10a, 10b ignites the fuel rich mixture from the interior of a cone-like fuel pattern 9 generated in the combustion chamber 2 by a fuel spray emitted from the injection nozzle 7. This initiation ignition in the ignition chamber 15 of the spark plug sleeve 12 which extends through the mixture envelope 14 ignites the air/fuel mixture charge of the combustion chamber 2 at two sides, specifically in the interior of the cone-like fuel spray pattern adjacent the mixture envelope 14 and at the outside of the mixture envelope 14.

Figure 3:
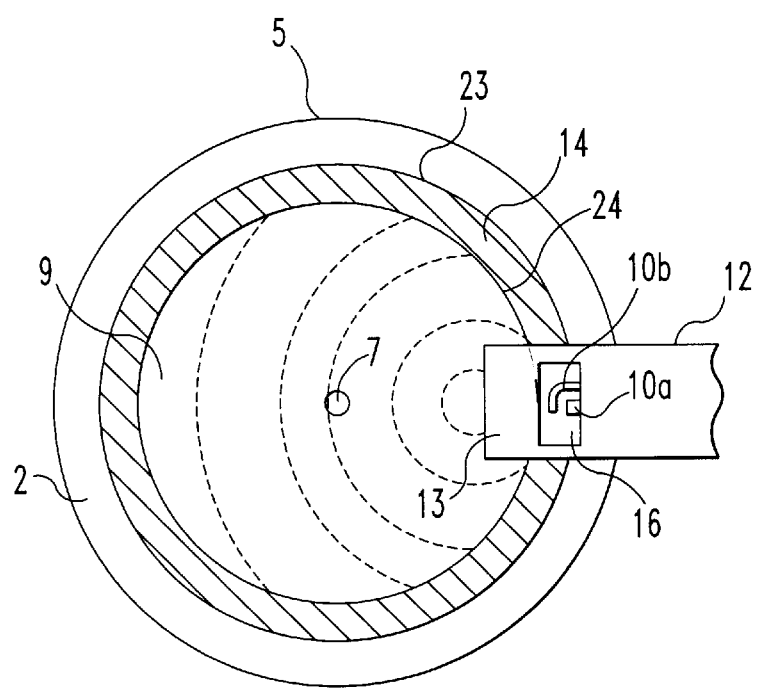
FIG. 3 shows schematically a combustion chamber with a representation of the mixture in the combustion chamber.

FIG. 3 shows schematically the combustion chamber 2 of ar internal combustion engine which is delimited by the interior wall 5 of the cylinderhead. During stratified charge operation of the internal combustion engine, the injection nozzle 7 injects fuel into the combustion chamber 2 at the end of the compression stroke of the piston. The fuel forms, with the combustion air supplied to the combustion chamber 2, an ignitable fuel/air mixture which, in accordance with the stratified charge process, is rich within the spray cone 9 and is lean outside the spray cone 9, that is, in the mixture envelope 14. The spark plug sleeve 12 extends through the mixture envelope 14 into the spray cone 9 so that rich mixture from the spray cone 9 is pressed during the compression stroke of the piston through the open end portion 13 of the spark plug sleeve 12 into the ignition chamber 15 while, at the same time, the ignition chamber 15 is vented through the circumferential opening 16 of the spark plug sleeve 12. If then a spark is generated between the electrodes 10a, 10b of a spark plug in the ignition chamber 15, the mixture in the ignition chamber is ignited and generates a flame beam igniting the mixture in the rest of the combustion chamber 2. The flame front in the spray cone 9 area is shown in FIG. 3 by dashed lines. It has an essentially spherical shape starting from the spark plug sleeve front opening and travels toward the side of the mixture envelope 14 opposite the initiation flame, that is, the spark plug sleeve front opening. About concurrently with the ignition at the inside 24 of the mixture envelope 14, an initiation flame beam shooting out of the opening 16 of the ignition chamber 15 ignites the fuel mixture in the mixture envelope 14 in the outer surface area 23.

This double sided ignition of the spray cone mixture 9 and the mixture envelope 14 increases the combustion speed so that the injection and ignition timing may he selected to be at a relatively late point in the compression stroke of the piston. During stratified charge operation of the internal combustion engine, the stratification is therefore more stable. And because of a reduced fuel consumption of the internal combustion engine when operating with a relatively large amount of excess air, the engine emissions, particularly nitrogen oxide ($NO_x$) and carbon oxide (CO) emissions, are reduced during stratified charge operation whereas, during full load operation of the engine, homogeneous combustion takes place in the combustion chamber.

What is claimed is:

1. An internal combustion engine with direct fuel injection comprising a number of operating elements, each including a combustion chamber delineated by an internal wall of a cylinderhead and a piston movably disposed in a cylinder, an injector mounted in said cylinderhead and having a fuel injection nozzle for injecting fuel into the combustion chamber in a cone-like pattern wherein an ignitable fuel/air mixture is formed with combustion air in the combustion chamber, a spark plug mounted on said cylinderhead and having electrodes disposed at its front end, and a spark plug sleeve surrounding said spark plug electrodes and projecting into said combustion chamber so as to form, adjacent said spark plug electrodes, an ignition chamber, said spark plug sleeve having a front opening within the interior of said cone-like fuel spray pattern in which a fuel-rich mixture is formed during fuel injection and which is pressed into said ignition chamber during each compression stroke of said piston.

2. An internal combustion engine according to claim 1, wherein said spark plug sleeve has at least one circumferentially extending opening in a side wall thereof providing for communication between said ignition chamber and said combustion chamber.

3. An internal combustion engine according to claim 2, wherein said at least one circumferential opening is disposed essentially at the outside of a rich fuel mixture envelope formed by said cone-like fuel spray pattern.

4. An internal combustion engine according to claim 2, wherein said at least one circumferential opening is disposed on a side wall of said spark plug envelope diametrically opposite said fuel injection nozzle.

5. An internal combustion engine according to claim 2, wherein said fuel injector is mounted on said cylinderhead in axial alignment with said piston so that said fuel injection nozzle is disposed centrally within said combustion chamber.

6. An internal combustion engine according to claim 5, wherein said fuel injector and said spark plug sleeve have longitudinal axes which intersect one another.

7. An internal combustion engine according to claim 1, wherein said spark plug sleeve is provided at its end adjacent the cylinderhead with a shoulder and with an internal thread and said spark plug has a mounting head provided with a threaded shank, which is screwed into said internal thread until the mounting head is seated on said shoulder.

8. An internal combustion engine according to claim 7, wherein said spark plug sleeve extends through said cylinderhead and is widened in the area of said shoulder.

9. An internal combustion engine according to claim 8, wherein said spark plug sleeve is cylindrical.

10. An internal combustion engine according to claim 1, wherein said combustion chamber has the shape of a cone.

11. An internal combustion engine according to claim 10, wherein the interior wall of said combustion chamber extends about parallel to the fuel mixture envelope formed in said combustion chamber during fuel injection.

12. An internal combustion engine according to claim 1, wherein said injector is mounted in an injector support structure disposed in said cylinderhead.

* * * * *